Dec. 23, 1952 H. N. MYLES 2,623,128
TELEPHONE INSTRUMENT WITH MAGNETIC HANDSET LATCH
Filed Feb. 14, 1947
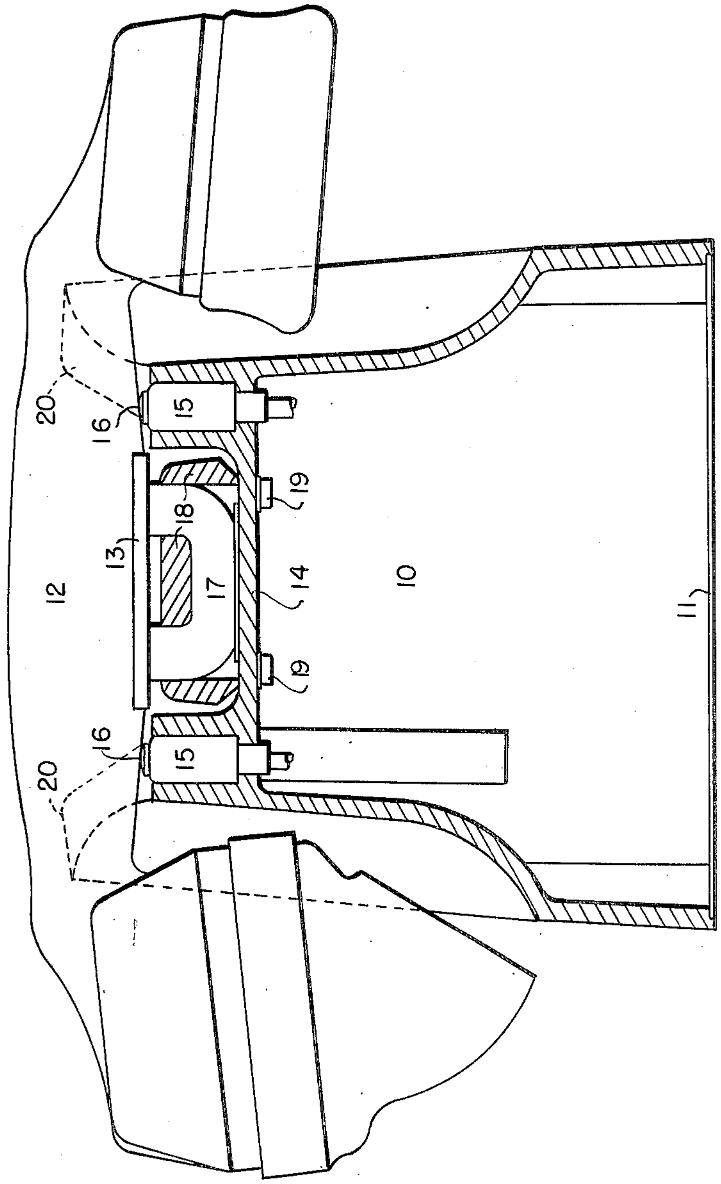
INVENTOR.
HERBERT NOEL MYLES
BY
Chas. W. Candy
ATTORNEY Patented Dec. 23, 1952 2,623,128

UNITED STATES PATENT OFFICE 2,623,128

TELEPHONE INSTRUMENT WITH MAGNETIC HANDSET LATCH

Herbert Noel Myles, Liverpool, England, assignor to Automatic Telephone & Electric Company Limited, Liverpool, England, a British company Application February 14, 1947, Serial No. 728,432
In Great Britain March 15, 1946

1 Claim. (Cl. 179—147)

The present invention relates to telephone instruments and is more particularly concerned with instruments of the type now generally employed in which the receiver and transmitter are combined in a single unit commonly known as a handset. The usual practice is for the handset when not in use to be accommodated on a so-called cradle and in its position of rest to depress a plunger, platform or the like so as to operate contact springs which establish circuit conditions corresponding to the quiescent state.

In order to facilitate the removal of the handset and to enable satisfactory gravity operation of the switchhook springs, it is usually arranged that the handset is quite a loose fit on the cradle. This is quite satisfactory in ordinary circumstances but may introduce difficulties in circumstances where excessive vibration or movement of the instrument as a whole are likely to be experienced, for instance on board ship or on a rapidly moving vehicle. Somewhat similar conditions arise if the handset is normally supported on a hook so as to hang substantially vertically as is sometimes done. The chief object of the invention is to provide a simple arrangement for maintaining the handset firmly in position in such circumstances while still enabling it to be readily removed when required for use.

According to the invention, in a telephone instrument of the handset type, undesirable movement of the handset is prevented by magnetic attraction between members on the handset and instrument respectively which are brought into close juxtaposition when the handset is in its position of rest.

The invention will be better understood from the following description of a possible embodiment which should be taken in conjunction with the accompanying drawing. This shows in section a telephone set of the type commonly employed in this country which has been modified in accordance with the invention so as to secure stability of the handset even if the instrument as a whole is subjected to rapid and repeated movement.

The body of the instrument is represented by 10 and this will be constructed of moulded material and will contain the usual components which are not shown. Access to the interior is gained by a removable plate 11 which normally fits into a recess so as to close the bottom of the moulding. The handset is represented by 12 and this is of conventional type comprising the usual receiver and transmitter which are electrically connected with the remainder of the instrument by a cord, not shown. The handle is modified by the inclusion of a plate 13 of magnetic material which is inset into the central portion. The telephone instrument is provided with a central platform 14 at the ends of which are projections accommodating metal bushes 15 forming guides for the switchhook plungers 16. On the platform 14 is mounted a U-shaped permanent magnet 17 by means of a moulded retaining member 18 which is held in place by screws 19 inside the instrument. The horns of the moulding which in the construction assumed serve to retain the handset in its correct position, are represented by 20. It will accordingly be seen that when the handset is in its normal position on the cradle the plate 13 engages the limbs of the magnet 17 and thus quite a powerful attractive force comes into play which serves to hold the handset firmly in position. There is no difficulty however in removing it with a straightforward pull when it is required for use. It will be appreciated that by the use of modern magnet material of high retentivity it is feasible to obtain a considerable pull without the use of a magnet of unwieldy size. Clearly a plurality of magnets may be used if this is considered desirable.

It may be pointed out that the arrangement according to the invention in addition to being simpler and more convenient than definite locking arrangements as sometimes employed hitherto, has the advantage that it produces more reliable operation of the switchhook springs whereas such arrangements have generally tended to impede such operation.

It will be understood that satisfactory results could also be obtained by providing a magnet in the handset handle with a co-operating plate on the instrument but as the magnet tends to be the heavier unit it is probably preferable to locate the magnet on the instrument. Moreover, it can be accommodated there with comparatively little alteration to standard instruments while the location of the magnet in the handset would involve appreciable changes and might make the handset less convenient to hold.

I claim:

A telephone set including a handset and a cradle support therefor, a U-shaped permanent magnet fixed in the center of said support with the ends of its arms adjacent the upper surface thereof, a bar of magnetic material mounted on the lower surface of the handset and extending across the two arms of said magnet and in contact therewith when the handset is placed on the support, said magnet attracting said bar to hold the handset firmly on said cradle support.

HERBERT NOEL MYLES.

REFERENCES CITED

The following references are of record in the file of this patent:

UNITED STATES PATENTS

| Number | Name | Date |
|---|---|---|
| 2,322,851 | Kalb | June 29, 1943 |
| 2,384,948 | McLoughlin | Sept. 18, 1945 |